Feb. 19, 1963 KAZUMI TAKEUCHI 3,078,339

SYSTEM FOR DEMODULATING CHROMINANCE SIGNAL IN COLOR TELEVISION

Filed March 16, 1960 2 Sheets-Sheet 1

United States Patent Office 3,078,339

Patented Feb. 19, 1963

3,078,339
SYSTEM FOR DEMODULATING CHROMINANCE SIGNAL IN COLOR TELEVISION

Kazumi Takeuchi, Harajuku-machi, Tozuka-ku, Yokohama City, Japan, assignor to Hitachi Limited, Chiyoda-ku, Tokyo, Japan Filed Mar. 16, 1960, Ser. No. 15,349
Claims priority, application Japan June 13, 1959
2 Claims. (Cl. 178—5.4)

This invention relates to a system for demodulating chrominance signal in color television.

The object of this invention is to provide a color television receiver which has simple construction and can be built at a lower cost.

In heretofore known color television receivers, a color subcarrier signal separated out of the composite video signals is supplied to two synchronous detectors and further two chrominance subcarrier reference synchronously oscillated by a separately transmitted color burst is applied to the synchronous detectors with each phase as special phases to be demodulated to obtain color signals or color difference signals. According to such known systems at least two vacuum valves are necessary for synchronous detection. Such vacuum valves can be dispensed with by this invention and they are substituted with several resistance or reactance circuits and an amplitude detector, thereby simplifying the construction and reducing the cost.

Figure 1:
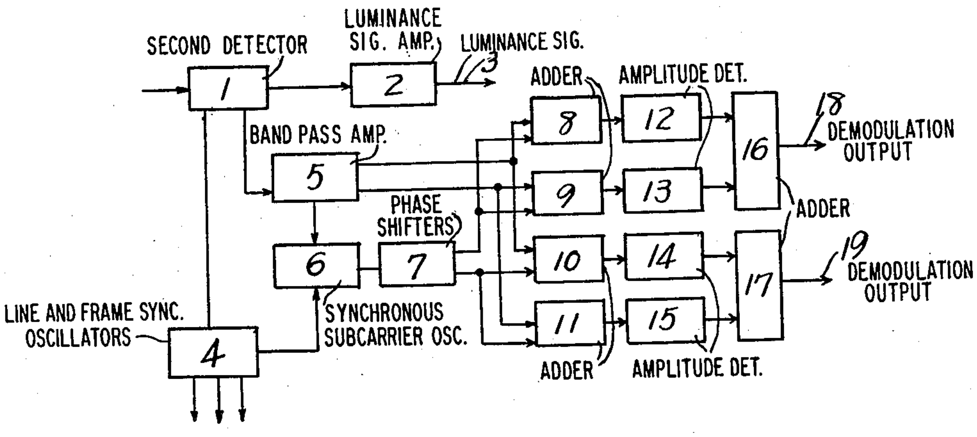
Figure 2:
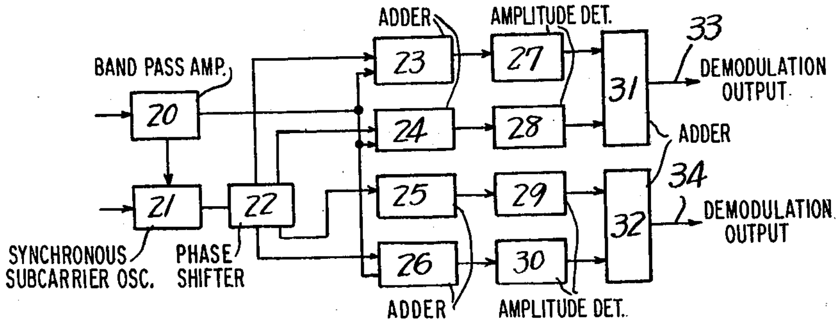
Figure 3:
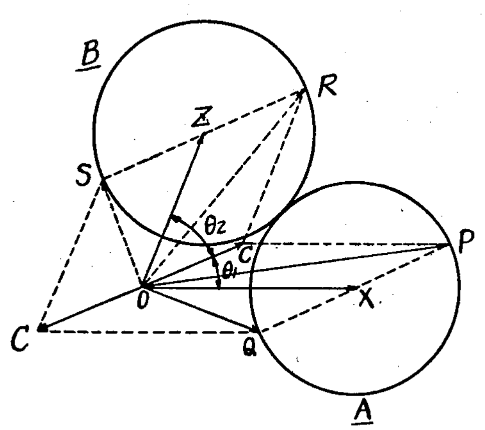
Figure 4:
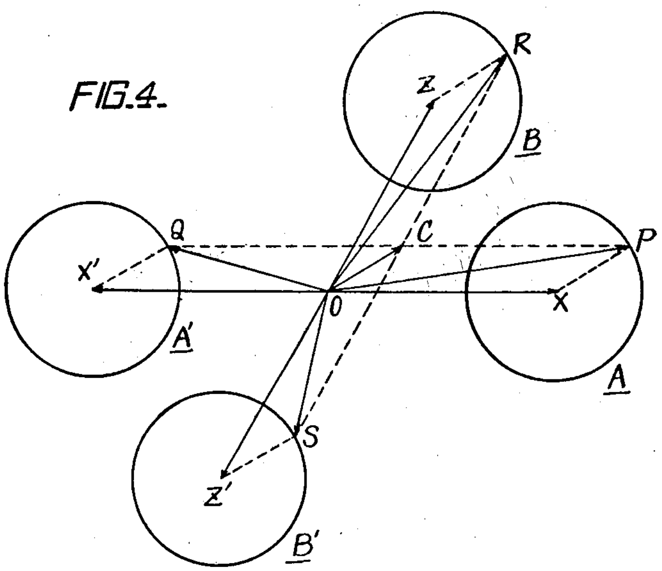

This invention will now be explained with reference to an embodiment as shown in the accompanying drawings, in which FIGS. 1 and 2 are block diagrams respectively illustrating a part of the circuit system of the color television receiver embodying demodulating system of chrominance signals in color television according to this invention, FIG. 3 is a vector diagram for illustrating the principle of operation of an embodiment of this invention as shown in FIG. 1, and FIG. 4 is a similar vector diagram relating to another embodiment as shown in FIG. 2.

Referring to FIG. 1, 1 represents a second detector of the color television receiver, 2 designates the circuit for amplifying the luminance signal only and transmitting it, and 3 represents the output of the luminance signal. The luminance signal is supplied to the jointly connected special electrode of a three electron gun type colour television display tube or to matrix circuits. 4 represents horizontal and vertical synchronous oscillation circuits, the output of which is connected to the deflecting yoke of the picture tube, 5 represents a band pass amplifier for the chrominance signal component and 6 represents synchronous oscillation circuits of the reference subcarrier, to which the color burst is supplied from band pass amplifier 5, and on the other hand, fly-back pulses are supplied thereto from horizontal and vertical synchronous oscillation circuit 4. 7 represents a phase shift circuit of the reference subcarrier which is used for regulating the reference subcarrier generated by the synchronous oscillation circuit 6 of the reference subcarrier to a special phase necessary for demodulating chrominance signals. 8, 9, 10 and 11 represent an addition circuit respectively for adding the carrier chrominance signals and the chrominance subcarrier references, which may be a resistance circuit or a reactance circuit. 12, 13, 14 and 15 represent an amplitude detector respectively, which has preferably square curve detection characteristics, though it is not necessary to limit it. 16 and 17 represent addition circuits respectively. 18 and 19 represent respectively color signals or color difference signals which have been demodulated.

The operation of the circuit arrangement shown in FIG. 1 will be explained by the vector diagrams as shown in FIG. 3, $\overrightarrow{OX}$ and $\overrightarrow{OZ}$ represent respectively special phases of the chrominance subcarrier references to demodulate the chrominance signal and also a set of corresponding chrominance subcarrier references is generated by phase shift circuit 7 of the subcarrier, and the signal represented by $\overrightarrow{OX}$ is supplied to the addition circuits 8, 9, and the signal represented by $\overrightarrow{OZ}$ is supplied to the addition circuits 10, 11 respectively. $\overrightarrow{OC}$ represents a transmitted carrier chrominance signal which may be obtained at the output terminal of the band pass amplifier together with the phase reversed $\overrightarrow{OC'}$. $\overrightarrow{OC}$ and $\overrightarrow{OC'}$ have the same magnitude and $\overrightarrow{OC}$ is supplied to addition circuits 8, 10, and $\overrightarrow{OC'}$ is supplied to 9, 11 respectively. The signal $\overrightarrow{OP}$ which is the vector sum of $\overrightarrow{OC}$ and $\overrightarrow{OX}$ is obtained at the output terminal of the addition circuit 8 and the signal $\overrightarrow{OQ}$ which is the vector sum of $\overrightarrow{OC'}$ and $\overrightarrow{OX}$ is obtained at the output terminal of the addition circuit 9. Since the change of the hue to be transmitted is transmitted as the change of the phase of carrier chrominance signal, $\overrightarrow{OC}$ and $\overrightarrow{OC'}$ revolve around the point O as the hue changes. At this time, P and Q revolve at the opposite positions on the circumference of circle A having X as a center. The diameter PQ of the circle A is equal to $\overrightarrow{OC'}$ and is proportional to the degree of color saturation. Similarly, the signal $\overrightarrow{OR}$ which is the vector sum of $\overrightarrow{OC}$ and $\overrightarrow{OZ}$ is obtained at the output terminal of the addition circuit 10 and the signal $\overrightarrow{OS}$ which is the vector sum of $\overrightarrow{OC'}$ and $\overrightarrow{OZ}$ is obtained at the output terminal of the addition circuit 11. The relation between these signals and circle B is similar to the relation between the signals and circle A as above mentioned. If the phase angle between $\overrightarrow{OC}$ and $\overrightarrow{OX}$ be $\theta_1$ and that between $\overrightarrow{OC}$ and $\overrightarrow{OZ}$ be $\theta_2$, then the following equations will be established:

$$|\overrightarrow{OP}|^2=|\overrightarrow{OX}|^2+|\overrightarrow{OC}|^2+2|\overrightarrow{OX}|\,|\overrightarrow{OC}|\cos\theta_1 \qquad (1)$$

$$|\overrightarrow{OQ}|^2=|\overrightarrow{OX}|^2+|\overrightarrow{OC'}|^2-2|\overrightarrow{OX}|\,|\overrightarrow{OC'}|\cos\theta_1$$

$$=|\overrightarrow{OX}|^2+|\overrightarrow{OC}|^2-2|\overrightarrow{OX}|\,|\overrightarrow{OC}|\cos\theta_1 \qquad (2)$$

Similarly, $$|\overrightarrow{OR}|^2=|\overrightarrow{OZ}|^2+|\overrightarrow{OC}|^2+2|\overrightarrow{OZ}|\,|\overrightarrow{OC}|\cos\theta_2 \qquad (3)$$

$$|\overrightarrow{OS}|^2=|\overrightarrow{OZ}|^2+|\overrightarrow{OC}|^2-2|\overrightarrow{OZ}|\,|\overrightarrow{OC}|\cos\theta_2 \qquad (4)$$

Amplitude detectors 12, 13, 14 and 15 are all square detectors as above described and the output signals amplitude-detected in these detectors can be expressed by the Equation 1, 2, 3 or 4 respectively. If the addition circuit 16 is operated to take the difference between signals of the Equation 1 and Equation 2, then the output as expressed by the following Formula 5 is obtained as the output 18:

$$4|\overrightarrow{OX}|\,|\overrightarrow{OC}|\cos\theta_1 \qquad (5)$$

Similarly, if the addition circuit 17 is operated to take the difference of the signals expressed by the Equations 3 and 4, then the output expressed by the following Formula 6 is obtained as the output 19.

$$4|\overrightarrow{OZ}|\,|\overrightarrow{OC}|\cos\theta_2 \qquad (6)$$

Formulae 5 and 6 are proportional to the orthogonal projection of the carrier chrominance signal corresponding to the special phases $\overrightarrow{OX}$ and $\overrightarrow{OZ}$ to be demodulated respectively so that these become required demodulated signals which are same as the signals demodulated by a conventional process using synchronous detectors.

The invention will be explained with reference to another embodiment in the following:

Referring to FIG. 2, 20 represents a band pass amplifier of chrominance signal component, and 21 represents synchronous oscillation circuits of the reference subcarrier signal, wherein color burst is derived from the band pass amplifier 20 for chrominance signal component and the reference subcarrier phase-controlled by the color burst is generated. 22 represents phase shift circuit for the reference subcarrier which is used for regulating the reference carrier wave generated in the synchronous oscillation circuit 21 of the reference subcarrier to special phases necessary for demodulating chrominance signals. Different from the above described example, the output signals of this phase shifting circuit 22 generates, besides a set of necessary special phase signals, another set of signals having phase difference of 180° from the said set. 23, 24, 25 and 26 represent respectively the circuit for adding carrier chrominance signals and chrominance subcarrier references which may be either a resistance circuit or reactance circuit. 27, 28, 29 and 30 represent amplitude detectors preferably of those having square curve detection properties similar to those in the former example. 31 and 32 represent addition circuit. 33 and 34 represent color signals or color difference signals demodulated respectively. The operation of the circuit will be explained with reference to FIG. 4, wherein $\overrightarrow{OX}$ and $\overrightarrow{OZ}$ represent special phases of the carrier chrominance signal to be demodulated and also a set of chrominance subcarrier references corresponding to the phases. $\overrightarrow{OX'}$ and $\overrightarrow{OZ'}$ represent another set of chrominance subcarrier references having phase difference of 180° to the said first set of the chrominance subcarrier reference, while $\overrightarrow{OX}=\overrightarrow{OX'}$ and $\overrightarrow{OZ}=\overrightarrow{OZ'}$. Two sets of these chrominance subcarrier references can be obtained from the phase shifting circuit 22. $\overrightarrow{OC}$ represents transmitted carrier chrominance signals which may be obtained by the band pass amplifier 20 of the carrier chrominance signal and it is supplied to addition circuits 23, 24, 25 and 26 in parallel. $\overrightarrow{OX}$ is supplied to addition circuit 23, and $\overrightarrow{OX'}$ is supplied to addition circuit 24. $\overrightarrow{OZ}$ is supplied to addition circuit 25 and $\overrightarrow{OZ'}$ to addition circuit 26. $\overrightarrow{OP}$ which is the vector sum of $\overrightarrow{OC}$ and $\overrightarrow{OX}$ is obtained at the output terminal of the addition circuit 23, while $\overrightarrow{OQ}$ which is the vector sum of $\overrightarrow{OC}$ and $\overrightarrow{OX'}$ is obtained at the output terminal of addition circuit 24 and $\overrightarrow{OC}$ rotates around the point O as the transmitted hue varies. Then P and Q rotate on the circumferences of circles A and A' having center at X and X' respectively. The radii of circles A and A' are equal to $\overrightarrow{OC}$ and proportional to the degree of colour saturation. Similarly, $\overrightarrow{OR}$ which is the vector sum of $\overrightarrow{OC}$ and $\overrightarrow{OZ}$ is obtained at the output terminal of addition circuit 25, and $\overrightarrow{OS}$ which is the vector sum of $\overrightarrow{OC}$ and $\overrightarrow{OZ'}$ is obtained at the output terminal of addition circuit 26. The relation between these signals and circles B and B' is similar to that between above mentioned circles A and A'. If the phase angle between $\overrightarrow{OC}$ and $\overrightarrow{OX}$ be $\theta_1$ and that between $\overrightarrow{OC}$ and $\overrightarrow{OZ}$ be $\theta_2$, then the Formulae 1, 2, 3 and 4 are established. The signals which are amplitude-detected at square curve characteristics detectors 27, 28, 29 and 30 become like the Formulae 1, 2, 3 and 4 respectively. If the addition circuit 31 is operated to take the difference between signals obtained by the Formulae 1 and 2, the output represented by Formula 5 is obtained at the terminal 33. Similarly, the output represented by Formula 6 is obtained at the output terminal 34 of addition circuit 32. These are same as the demodulated signals using the synchronous detectors same as in the former example. In the foregoing description, the properties of detectors were assumed to be square curve characteristics, but if there are provided the following conditions:

$$|\overrightarrow{OX}|\gg|\overrightarrow{OC}|$$

$$|\overrightarrow{OZ}|\gg|\overrightarrow{OC}|$$

Then the properties of detector may be generally n-power property. Under the above conditions, the Equation 1 becomes $$|\overrightarrow{OP}|^2=|\overrightarrow{OX}|^2\left(1+\frac{|\overrightarrow{OC}|^2}{|\overrightarrow{OX}|}+2\frac{|\overrightarrow{OC}|}{|\overrightarrow{OX}|}\cos\theta_1\right) \qquad (7)$$

Accordingly, the signal obtained through the detector having $n$-power detection characteristics becomes as the following Formula 8 by approximate calculation by omitting $$\left\{\frac{|\overrightarrow{OC}|}{|\overrightarrow{OX}|}\right\}^2 \quad \overrightarrow{OX}^n\left(1+n\frac{|\overrightarrow{OC}|}{|\overrightarrow{OX}|}\cos\theta_1\right) \qquad (8)$$

Similarly, the detected signal obtained by the Formula 2 becomes as the following Formula 9

$$|\overrightarrow{OX}|^n\left(1-n\frac{|\overrightarrow{OC}|}{|\overrightarrow{OX}|}\cos\theta_1\right) \qquad (9)$$

Similarly, the detected signal obtained by the Formula 3 becomes as the following Formula 10

$$|\overrightarrow{OZ}|^n\left(1-n\frac{|\overrightarrow{OC}|}{|\overrightarrow{OZ}|}\cos\theta_2\right) \qquad (10)$$

Similarly, the detected signal obtained by the Formula 4 becomes as the following Formula 11

$$|\overrightarrow{OZ}|^n\left(1-n\frac{|\overrightarrow{OC}|}{|\overrightarrow{OZ}|}\cos\theta_2\right) \qquad (11)$$

Each signal of the above Formulae 8, 9, 10 and 11 is obtained by amplitude detectors 12, 13, 14 and 15 as shown in FIG. 1 respectively. In the second example, such signal is obtained from detectors 27, 28, 29 and 30 as shown in FIG. 2 respectively. If the difference signal of the Formulae 8 and 9 is taken out then the signals of the following Formula 12 is taken from the output terminals of the addition circuit 16 or 31 and if the difference of Formulae 10 and 11 is taken out, then the signal of the following Formula 13 is obtained from the output terminal of addition circuit 17 or 32.

$$2n|\overrightarrow{OC}|\,|\overrightarrow{OX}|^{(n-1)}\cos\theta_1 \qquad (12)$$

$$2n|\overrightarrow{OC}|\,|\overrightarrow{OZ}|^{(n-1)}\cos\theta_2 \qquad (13)$$

Formulae 12 and 13 are same as the signals detected by a conventional synchronous detectors as above described. The addition circuit is so arranged that after the signals are added they are detected and then their difference is taken, yet it may be so arranged that subcarrier wave signals to be added may be applied to the anode and cathode of the detector respectively and then the difference of signals detected can be obtained by the current flowing through the common impedance.

As above described, color signal demodulators of a known color television is a synchronous demodulator so that it has been necessary to use a vacuum tube having more than two elements, but in the present invention the demodulator may consist of several resistance or reactance addition circuits and four amplitude detectors (crystal detectors) so that the construction can be made very simple and inexpensive.

What I claim is:

1. A system for demodulating a color television chrominance signal, said system comprising a carrier chrominance signal source supplying two carrier chrominance signals C and C′ having opposite phases, chrominance subcarrier reference signal sources supplying signals X and Z phases locked to the color signal, means to add one of said carrier chrominance signals and one of said chrominance subcarrier reference signals and then to supply vector sums of $X+C$, $X+C'$, $Z+C$ and $Z+C'$, means to detect amplitudes of said four vector sums individually, means to subtract said detected output $(X+C')$ from said detected output $(X+C)$, means to subtract said detected output $(Z+C')$ from said detected output $(Z+C)$, and means to use the two subtracted output signals as two color signals.

2. A system for demodulating a color television chrominance signal according to claim 1, wherein said carrier chrominance signal source supplies a carrier chrominance signal C to four adders, said chrominance subcarrier reference signal sources supplying four reference signs X, X′, Z and Z′ having phases locked to the color signal, said signals X and Z each having a phase adapted to reproduce a predetermined demodulation output with synchronous demodulations being individually effected on said phases of X and Z, the phase of said signal X being opposite to the phase of said signal X′, the phase of said signal Z being opposite to the phase of said signal Z′, said four adding means adding individually said carrier chrominance signal and one of said chrominance subcarrier reference signals and supplying vector sums $X+C$, $X'+C$, $Z+C$ and $Z'+C'$, said system further comprising four means to detect individually amplitudes of said four vector sums, means to subtract said detected output $(X'+C)$ from said detected output $(X+C)$, means to subtract said detected output $(Z'+C)$ from said detected output $(Z+C)$, and means to use said two subtracted output signals as two color difference signals.

References Cited in the file of this patent

UNITED STATES PATENTS

| | | |
|---|---|---|
| 2,858,428 | Torre | Oct. 28, 1958 |
| 2,899,492 | Cooperman et al. | Aug. 11, 1959 |
| 2,935,686 | Kerns et al. | May 3, 1960 |